March 29, 1932.   H. O. HEM   1,851,542
COMBINED WEIGHING AND COUNTING SCALE
Filed Dec. 17, 1923   2 Sheets-Sheet 1
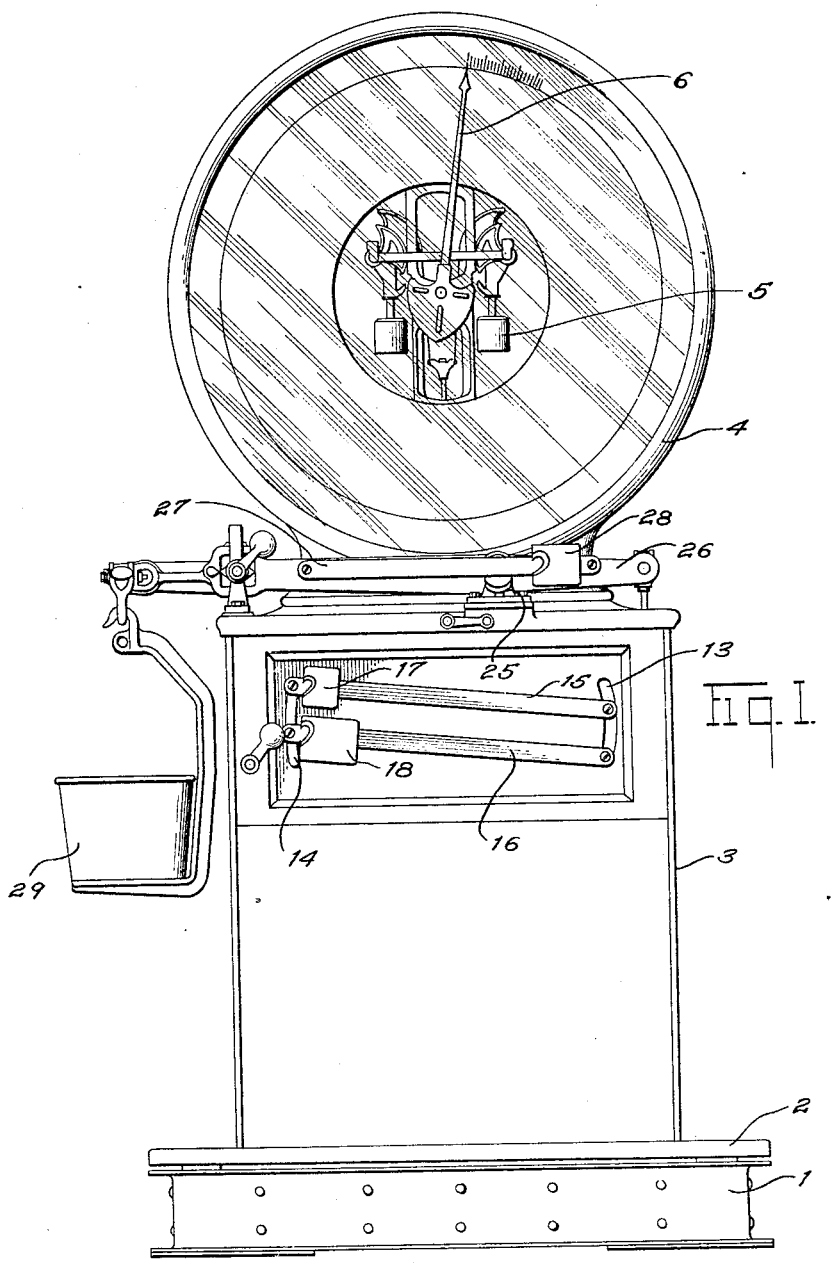
Inventor
HALVOR O. HEM
By C. O. Marshall
Attorney March 29, 1932. H. O. HEM 1,851,542
COMBINED WEIGHING AND COUNTING SCALE
Filed Dec. 17, 1923  2 Sheets-Sheet 2
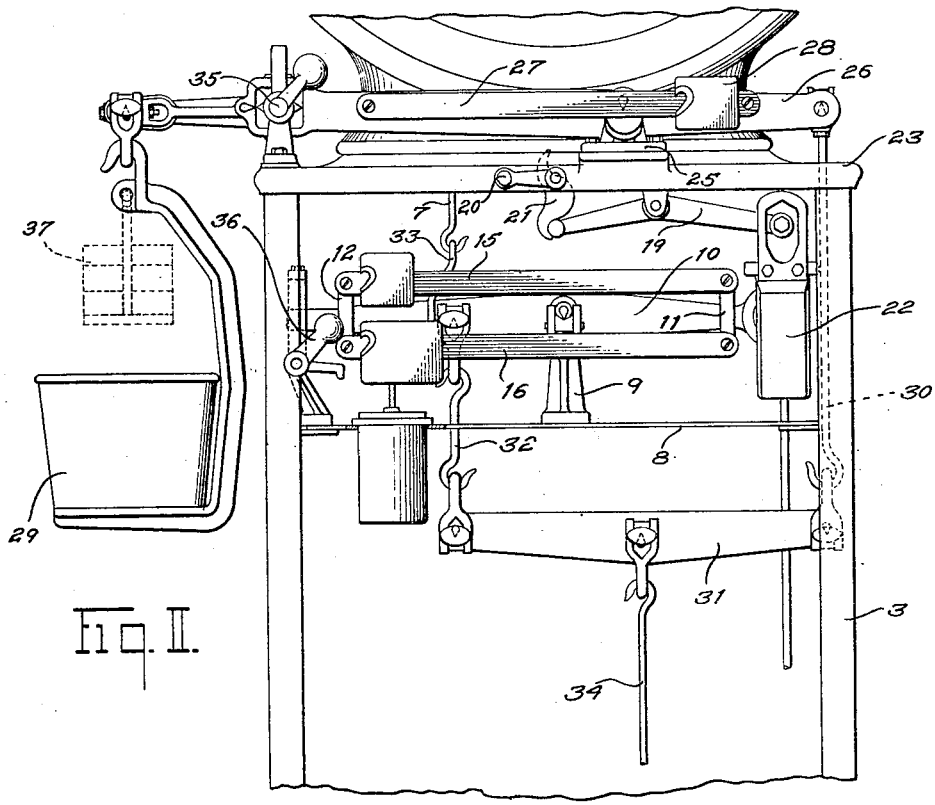
Fig. II.
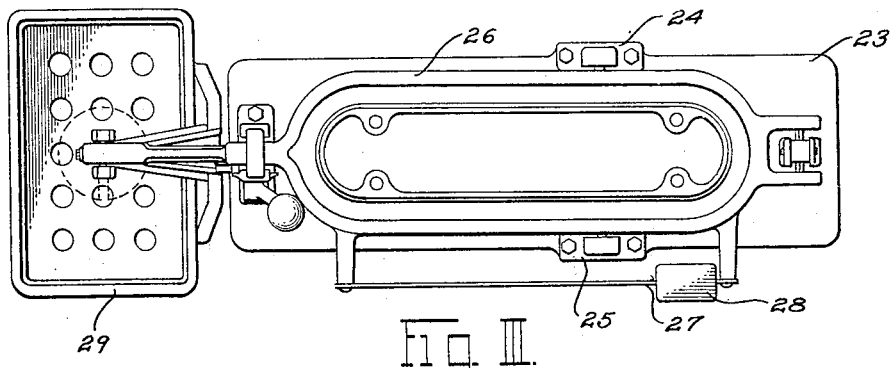
Fig. III.
Inventor
HALVOR O. HEM.
By C. O. Marshall
Attorney Patented Mar. 29, 1932

1,851,542

UNITED STATES PATENT OFFICE

HALVOR O. HEM, OF TOLEDO, OHIO, ASSIGNOR TO TOLEDO SCALE MANUFACTURING COMPANY, OF TOLEDO, OHIO, A CORPORATION OF NEW JERSEY

COMBINED WEIGHING AND COUNTING SCALE

Application filed December 17, 1923. Serial No. 681,039.

This invention has for its principal object the provision of a scale which may be used for either weighing or counting or for both weighing and counting at the same time.

Another object of the invention is the provision of a scale which may be used either for weighing or for counting, in which the mechanism used for weighing is unaffected by the setting of counterpoises, etc. on the mechanism used for counting, and vice versa.

Other objects and advantages will be apparent from the following description, in which reference is had to the accompanying drawings illustrating a preferred embodiment of my invention and wherein similar reference numerals designate similar parts throughout the several views.

In the drawings:

Figure I is a front elevational view of a weighing scale embodying my invention;

Figure II is an enlarged fragmentary view showing the lever mechanism thereof; and Figure III is a plan view showing the counting beam of the scale and the upper end of the cabinet upon which the counting beam is supported.

The base 1 of the scale houses and supports the platform levers (not shown), which in turn support the platform 2. A cabinet 3 is mounted upon the base at the rear of the platform and is surmounted by a substantially watch-case-shaped head 4 which houses automatic load-counterbalancing mechanism 5 and an indicator 6, and a link 7 extends from the automatic load-counterbalancing mechanism downwardly into the cabinet 3.

Supported within the cabinet 3 is a shelf 8 upon which is fixed a fulcrum bracket 9 which supports a lever 10. The lever 10 is provided with brackets 11 and 12 which project through arcuate slots 13 and 14 in the front of the cabinet 3 and carry beams 15 and 16, the beams 15 and 16 which thus lie outside the cabinet 3 being equipped with poises 17 and 18.

In the scale shown a unit weight depositing lever 19 is fulcrumed below the top of the cabinet 3 and is adapted when operated by means of a handle 20 and cam 21 to deposit a unit weight 22 upon the lever 10 and thereby increase the weighing capacity of the scale.

Mounted upon the top plate 23 of the cabinet 3 are fulcrum brackets 24 and 25 which support a lever 26, the lever being open and surrounding the lower end of the head 4. The lever 26 is equipped with a tare beam 27 and poise 28 and also with a specimen pan 29 which is supported upon one end of the beam. The other end of the beam is connected by means of a link 30 to one end of a lever 31, which in turn is connected at its other end by means of a link 32 to the lever 10 and through a stirrup 33 to the link 7.

The lever 31 is connected at a point intermediate its points of connection with the levers 10 and 26 to the platform lever mechanism (not shown) by means of a steelyard rod 34. When a load is placed upon the platform 2 the pull on the steelyard rod 34 is transmitted by the lever 31 to the link 32 and thence to the weighing lever 10 and, through the link 7, to the automatic load-counterbalancing mechanism of the scale. The pull on the rod 34 is, however, also transmitted through the link 30 to the counting scale lever 26.

If the counting scale lever be locked by means of the lever locking device 35 the link 30 will act merely as a fulcrum support for the lever 31, and the pull will be transmitted through the link 32 to the weighing lever 10. If the weighing lever 10 be locked by means of the lever locking device 36 the link 32 will act as a fulcrum support for the lever 31, and the pull will be transmitted through the link 30 to the counting lever 26. The device may thus be used either as a counting or a weighing scale.

When it is used as a counting scale one or more specimens of the lot of articles to be counted is placed in the specimen pan 29. If the multiplication of the lever mechanism between the specimen pan and the platform 2 is 100, it will take 100 articles on the platform to balance the counting lever 26 with one article in the specimen pan. If the multiplication of the lever mechanism is 50, it will take 50 articles on the platform to balance the counting lever 26. The lever mechanism may be of any desired multiplication. If the articles to be counted are placed in a box or other container, the container may be counterbalanced by means of the tare poise 28 on the beam 27. If the weight of the container is too great to be counterbalanced by the poise 28 additional tare weight may be added, as indicated in dotted lines at 37. If when a load is placed on the scale the weighing lever 10 and the counting lever 26 are both unlocked, the weight of the load will be automatically indicated on the dial by the indicator 6 and the count of the load may also be taken by means of the lever 26. If a container is used, its weight may be counterbalanced independently on the beam 27 for the counting mechanism and on the beams 15 and 16 for the weighing mechanism. Should it be desired to weigh an occasional load while the tare poise 28 is set for counting out lots of articles in containers of uniform weight, the load may be weighed by the automatic mechanism and its tare taken care of on the beams 15 and 16 without disturbing the setting of the tare poise on the counting beam and if, after a weighing, the tare poises on the weighing beam are inadvertently left in counterbalancing position, the accuracy of the count will be unaffected. If the tare poise on the counting beam be left away from zero position, no error will result in the weight indicated by the weighing mechanism, for though the counting and weighing mechanism are connected to the same platform lever mechanism, they act independently.

The embodiment of my invention herein shown and described is to be regarded as illustrative only, and it is to be understood that the invention is susceptible to variation, modification and change within the spirit and scope of the subjoined claims.

Having described my invention, I claim:

1. In a device of the class described, in combination, a commodity-receiver, weighing mechanism including automatic load-counterbalancing mechanism and beam load-counterbalancing mechanism, a counting beam, and an intermediate lever, one end of said intermediate lever being connected to said counting beam, the other end of said intermediate lever being connected to said beam load-counterbalancing mechanism, said intermediate lever being connected at its center to said commodity-receiver.

2. In a device of the class described, in combination, a commodity-receiver, weighing mechanism, counting mechanism, means connecting said weighing mechanism and counting mechanism to said commodity-receiver whereby a load on said commodity-receiver independently acts upon said weighing mechanism and counting mechanism, means for locking said weighing mechanism, and means for locking said counting mechanism.

3. In a device of the class described, in combination, a commodity-receiver, weighing mechanism, counting mechanism, an intermediate lever, means connecting one end of said intermediate lever to said weighing mechanism, means connecting the other end of said intermediate lever to said counting mechanism, means connecting said intermediate lever to said commodity-receiver, said connections to said commodity-receiver being connected to said intermediate lever between its points of connection to said weighing and counting mechanisms, means for locking said weighing mechanism, and means for locking said counting mechanism.

4. In a device of the class described, in combination, a commodity-receiver, weighing mechanism, counting mechanism, an intermediate lever, said intermediate lever being connected at its center to said commodity-receiver and having its ends connected respectively to said weighing mechanism and counting mechanism, means for locking said weighing mechanism, and means for locking said counting mechanism.

5. In a device of the class described, in combination, a weighing scale base, a platform lying thereabove, a cabinet supported upon said base, a housing surmounting said cabinet, automatic load-counterbalancing and indicating mechanisms supported within said housing, beam weighing mechanism supported within said cabinet, means connecting said automatic load-counterbalancing mechanism and said beam weighing mechanism, a counting beam supported upon said cabinet, an intermediate lever hung at its ends from said beam weighing mechanism and said counting beam, and means connecting said intermediate lever at a point between its ends to said platform.

6. In a device of the class described, in combination, a weighing scale base, a platform lying thereabove, a cabinet supported upon said base, a housing surmounting said cabinet, automatic load-counterbalancing and indicating mechanisms supported within said housing, beam weighing mechanism supported within said cabinet, means connecting said automatic load-counterbalancing mechanism and said beam weighing mechanism, a counting beam supported upon said cabinet, an intermediate lever hung at its ends from said beam weighing mechanism and said counting beam, means connecting said intermediate lever at a point between its ends to said platform, means for locking said beam weighing mechanism, and means for locking said counting beam.

HALVOR O. HEM.